March 31, 1936.  A. J. McMASTER ET AL  2,035,906
APPARATUS FOR PRODUCING ELECTRICAL CURRENT IN RESPONSE TO LIGHT
Filed April 6, 1931
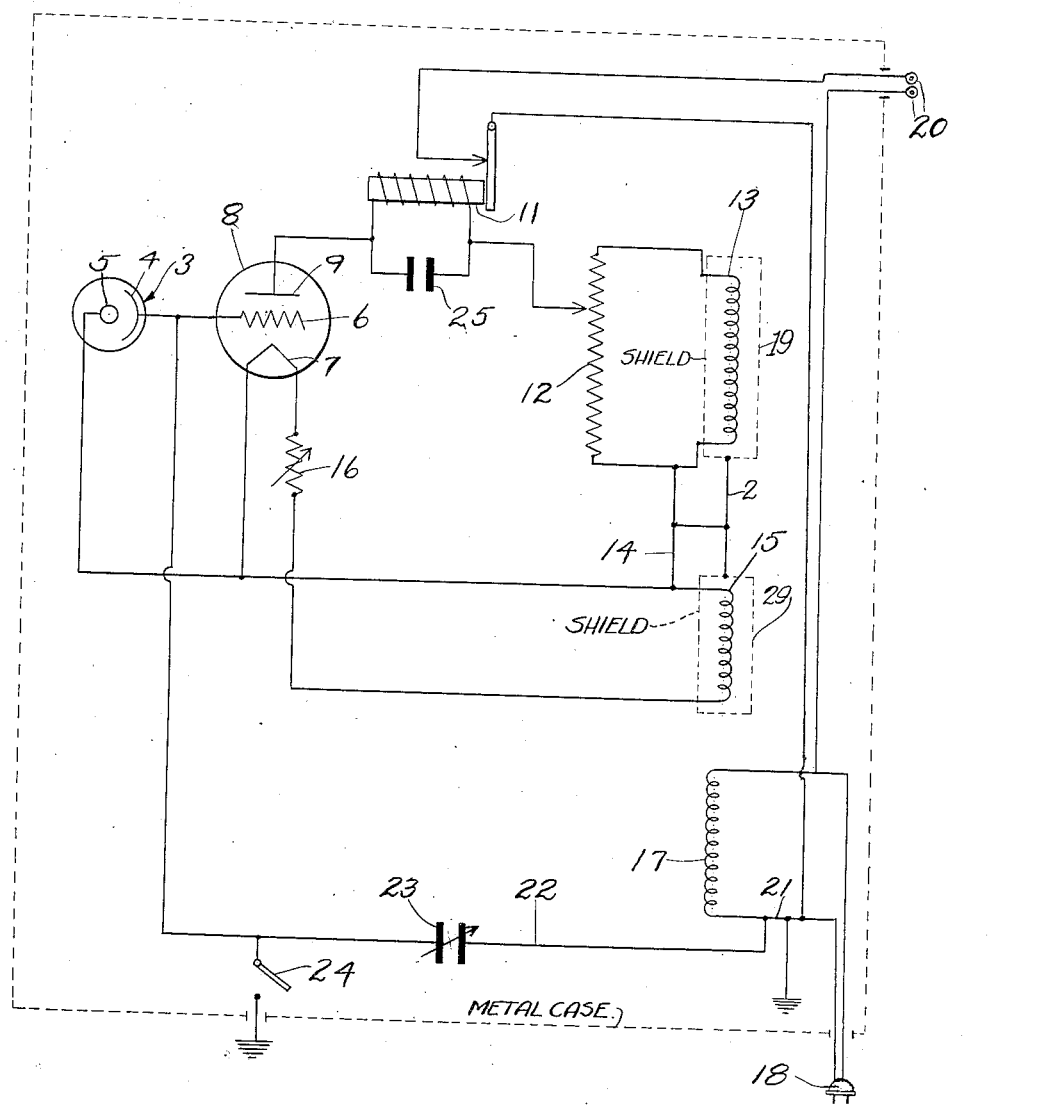
Inventors
Archie J. McMaster
James G. Wells
By George E. Mueller
Atty.

Patented Mar. 31, 1936

2,035,906

UNITED STATES PATENT OFFICE 2,035,906

APPARATUS FOR PRODUCING ELECTRICAL CURRENT IN RESPONSE TO LIGHT

Archie J. McMaster and James G. Wells, Chicago, Ill., assignors to G-M Laboratories, Inc., Chicago, Ill., a corporation of Illinois Application April 6, 1931, Serial No. 528,218

12 Claims. (Cl. 250—41.5)

Our invention relates to a photoelectric system and particularly to an apparatus for producing an electrical current in response to light.

Photoelectric cells are being used extensively for producing electrical currents for operating relays, meters, counters, automatic lighting systems and the like.

An object of this invention is to provide a sensitive and positive photoelectric system.

A further object is to provide a device in which the potential and current of the photoelectric cell is low in order to prolong the life of the cell.

A further object is to provide an apparatus which is simple in construction and economical to manufacture.

Other objects and advantages will appear as the description proceeds.

A photoelectric cell possesses an extremely high impedance so that it is necessary to employ a high impedance load for coupling the photoelectric cell to the input circuit of an amplifying valve.

In accordance with the general features of the invention, we operate the photoelectric cell and its amplifier on alternating current supplied through a transformer and utilize the capacity between the windings thereof as a load impedance for the photoelectric cell for coupling the photoelectric cell to its amplifier, and utilize any voltage appearing between the terminals of different windings in the operation of the system. These voltages may result from the voltages of the individual windings themselves when capacity connections between various portions thereof are unsymmetrical.

Referring to the drawing, the single figure diagrammatically illustrates a photoelectric system embodying the invention. A light sensitive cell 3 having a cathode 4 and anode 5 is provided with its cathode and anode directly connected to the grid 6 and cathode 7 respectively of an audion or thermionic tube 8. The audion also has an anode 9 and the anode circuit of the audion includes a relay 11 and potentiometer 12 connected across the ends of a secondary winding 13 of a transformer. The relay may be used for controlling any type of circuit from terminals 20. One side of the secondary winding of the transformer is connected by a conductor 14 to the cathode 7. Another secondary 15 is provided for heating the cathode 7 and a variable resistance 16 may be provided in the heating circuit of the cathode to control the temperature thereof. The primary winding 17 of the transformer is connected by a plug 18 to any suitable source of alternating current.

As is usual in transformers, the primary and secondary windings are insulated from each other. In the transformer illustrated, a shield is introduced between the primary and secondary windings. It has been found that such a shield connected in the circuit as shown materially improves the operation of the system. One particular form of transformer that has been found satisfactory for use in this system consists of a secondary winding wound upon the core of a transformer. Around the secondary is a non-continuous copper sleeve made non-continuous to avoid the effect of a short circuit winding, and the secondary 15 and primary 17 are wound over the copper sleeve. The copper sleeve is connected to conductor 14 by means of conductor 2. It also may be advantageous in some instances to provide a similar shield 29 for the secondary winding 15. In the usual source of alternating electric current one side of the source is grounded. Assuming that in the instant case the side 21 of primary 17 is grounded, a conductor 22 is led from this side through a variable condenser 23 to the grid of audion 8. It is also possible to connect the grid directly to ground by closing a switch 24.

In operation power is supplied to the primary winding 17 of the transformer from a suitable alternating current supply. Current will then flow through the valve 8 to operate the relay or current responsive device 11 in accordance with the illumination of the cathode 4 of the photoelectric cell. The valve will respond to an increase of illumination of the photoelectric cell to increase the current through the relay 11. Under any given conditions, the current to the relay 11 may also be increased by increasing the voltage, relative to the cathode 17, that is applied through the relay 11 to the anode 9 of the valve. This voltage is varied by adjusting the potentiometer 12. Preferably, the switch 24 is kept in its open position and the condenser 23 is adjusted to have a small capacity. The sensitivity of the response of the system to a change of illumination on the cathode 4 of the photoelectric cell increases as the capacity of the condenser 23 decreases. Generally, an adjustment of the condenser 23 will also vary the current flowing through the relay 11. Either the condenser 23 or the potentiometer 12 may be adjusted to produce a desired flow of current through the relay 11 at any given illumination of the photoelectric cell.

The variable condenser between the grid and ground serves as a very useful means of controlling the plate current at any particular light level. It has been found that with the grid connected metallically to ground, considerable light must fall on the cell before the plate current increases appreciably. However, if the variable condenser is placed in this grid to ground circuit, the capacity of this condenser may be reduced to such a point that a small increase in illumination immediately causes an increase of plate current. Thus, the variable condenser serves as a means of adjusting the circuit to the critical point for any light level within limits. In this way a very small decrease of light will always be effective in changing the plate current.

The theory of operation of the system is believed to be substantial as follows: Although only alternating current is supplied to the system, the valve 8 and the photoelectric cell are inherently self-rectifying so that the flow of current through them is necessarily uni-directional. The current through the anode cathode circuit of the valve, will be a pulsating direct current which may be considered as having a direct current component and an alternating component superimposed thereupon. The anode cathode circuit of the valve, which may also be termed the anode circuit, is the circuit that extends from the anode 9 through the valve to the cathode 7, thence through the conductor 14, the transformer winding 13 together with the potentiometer 12, and through the relay 11 in parallel with the condenser 25 back to the anode 9. Thus, the direct current component will flow through the relay 11, while the condenser 25 will offer a low impedance path around the relay 11 to the alternating component. In operation, the valve 8 will cause a negative charge to appear upon its control grid 6 as is usual in valves of this type. When the photoelectric cell is illuminated this charge will leak off through the photoelectric cell back to the anode cathode circuit of the valve.

There is a certain amount of electrical capacity between the primary winding 17 of the transformer and the secondary windings 13 and 15. In the circuit shown in the drawing, wherein there is a connection between the primary winding and the grid 6 of the valve, this inter-winding capacity of the transformer is introduced between the grid 6 and the anode cathode circuit and functions as a coupling impedance for the photoelectric cell.

It is probable that at least a part of the voltage of the winding 17 is introduced into the path extending from the grid 6 through the condenser 23 and thence via the capacity between the windings of the transformer to the anode cathode circuit of the valve. This can occur as a result of the capacity of separate portions of the winding 17 with portions of the shield 29 or with the other windings of the transformer.

In the case of the shield 29, this capacity is merely that electrical capacity which exists between the metal of the winding 17 and that of the shield 29. Thus, for example, the capacities between the two end portions of the winding 17 and the shield 29 are connected in series by virtue of their common connection to the shield. Therefore an alternating current will traverse these capacities and the shield will assume a potential with respect to the winding 17 which is midway between that of the two end portions of the winding 17. In Fig. 1 of the drawing, the shield 29 is connected to the cathode 7 of the valve 8, while one terminal of the winding 17 is connected to the condenser 23 which in turn is connected to the grid 6 of the valve. When the switch 24 is closed, the terminal 21 of the winding 17 has a direct connection to the grid 6. As a result, the voltage which appears between the shield 29 and the terminal 21 of the winding 17 is introduced into the coupling circuit which extends from the grid 6 through the inter-winding capacity of the transformer to the cathode 7 of the valve. While this voltage is alternating, we denominate it a "biasing potential" by analogy with direct current systems.

Inasmuch as one of the conductors of the usual alternating current supply is grounded, the coupling circuit already referred to will be grounded at the transformer and therefore ground connections are to be avoided at other parts of the system.

When power is supplied to the system, current will flow through the valve 8 as already noted due to the voltage of the winding 13. A voltage for causing a flow of current through the photoelectric cell will arise due to the accumulation of a negative charge on the grid 6 of the valve as already noted, and a voltage may also be imposed across the photoelectric cell due to any voltage induced or appearing between the windings of the transformer. While the system is powered by alternating current, the rectifying action of the valve and the photoelectric cell define the positive and negative conditions of the circuit and it is therefore convenient to employ the terms "positive" and "negative" in describing the action of the valve and the photoelectric cell. The accumulation of a negative charge upon the grid 6 will maintain the grid at a potential below that of the cathode 7. If the photoelectric cell is dark no current can flow therethrough, that is, its resistance will be substantially infinite, but this will not produce the condition that is generally known as a "floating grid" inasmuch as the action of the alternating current seems to steady the operation of the valve. It is to be noted, that while the photoelectric cell offers the only path capable of carrying direct current to the grid, alternating current can flow to the grid through various capacities such as the interelectrode capacities of the photoelectric cell and of the valve and through the cell coupling circuit including the primary winding 17 of the transformer. Thus, with the photoelectric cell dark, the grid potential relative to the cathode will be determined and this will in turn determine the current flow through the anode cathode circuit of the valve and through the relay 11, assuming that the adjustment of the potentiometer 12 and the variable condenser 23 are fixed. When light falls upon the cathode 4 of the photoelectric cell, current will flow through the cell to remove the electrons that flow to the grid 6 from the cathode 7 within the valve. This current flow will alter the potential of the grid so as to make it less negative with respect to the cathode 7 and will thereby increase the current flowing through the anode circuit and the relay 11.

It is believed that the circuit through the condenser 23 and the inter-winding capacity of the transformer, which has already been referred to as the coupling circuit of the photoelectric cell, has a certain steadying effect upon the operation of the valve and that the high impedance of this circuit functions as a coupling impedance for coupling the photoelectric cell to the grid of the valve. While the coupling circuit cannot pass direct current, it will pass alternating current and this alternating current is controlled in part by the illumination on the photoelectric cell and contributes to the control of the operation of the valve.

It is well known that in a valve amplifier system there is often an optimum valve for the impedance in a coupling circuit. Photoelectric cells have an extremely high internal impedance and it is usually impractical to provide a coupling resistor as great as the optimum valve. In the present system, when the capacity of the condenser 23 is decreased, the coupling impedance is increased to bring it nearer the optimum valve, thereby increasing the sensitivity of the operation of the system.

The relay 11 has been shown merely to illustrate a current responsive device in the anode circuit. Any other current responsive device such as a meter or the like may be included in this circuit. A condenser 25 is preferably connected across the relay because an alternating current source is used in the anode circuit. In practicing this invention, it is found that the photoelectric cell has an extremely long life, because the current carried by this cell is so minute that no ionization occurs with the cell. The voltage also is considerably less than such cells are required to carry in the ordinary photoelectric system.

It will be understood that the nature and embodiment of the invention herein described and illustrated is merely a convenient and useful form of the invention, and that many changes and modifications may be made therein without departing from the spirit and scope of the invention.

What we claim as new and desire to protect by Letters Patent of the United States is:—

1. In a photoelectric system, a transformer including a primary and secondary, an audion having a cathode, a grid, and an anode, an anode cathode circuit including the secondary of said transformer, a current responsive device in said anode cathode circuit, a photoelectric tube having a cathode connected to the grid of the audion and an anode connected to said anode cathode circuit, and a connection from the grid of the audion to the primary of the transformer.

2. A circuit as defined in claim 1, wherein the primary of the transformer is grounded.

3. A circuit as defined in claim 1, wherein a shield is provided between the primary and secondary of the transformer.

4. A circuit as defined in claim 1, wherein said connection from the grid to the primary of the transformer includes a variable impedance.

5. In a photoelectric system, a transformer including a primary and secondary, a shield between said primary and secondary, an audion having a grid, a cathode and an anode, an anode cathode circuit including the secondary of said transformer and a current responsive device, a photoelectric tube having a cathode connected to the grid of the audion and an anode connected to the cathode of the audion, and a connection including a variable condenser between the grid of the audion and the primary of said transformer.

6. In a photoelectric system, a transformer including a primary and secondary, a shield between said primary and secondary, an audion having a grid, a cathode and an anode, an anode cathode circuit including the secondary of said transformer and a current responsive device, said shield being connected to said anode cathode circuit, a photoelectric tube having a cathode connected to the grid of the audion and an anode connected to the cathode of the audion, a connection including a variable condenser between the grid of the audion and the primary of said transformer, and a ground connection to the primary of said transformer.

7. In a photoelectric system, a transformer including a primary and secondary, a shield between said primary and secondary and connected to said secondary, an audion having a grid, a cathode and an anode, an anode circuit including the secondary of said transformer and a current responsive device, a photoelectric tube having a cathode connected to the grid of the audion and an anode connected to the cathode of the audion, a connection including a variable condenser between the grid of the audion and the primary of said transformer, and a switch disposed in the last mentioned connection between the grid and said variable condenser adapted to connect the grid directly to ground.

8. In a photoelectric system, a transformer having a primary and a pair of secondaries, shields between the primary and secondaries, an audion having a grid, a cathode supplied with current by one of said secondaries, and an anode, an anode cathode circuit including the other secondary of the transformer and a current responsive device, a photoelectric tube having a cathode connected to the grid of the audion and an anode connected to the cathode of the audion and to said shields of said transformer, a variable condenser and a connection through said variable conndenser from the grid of the audion to the primary of the transformer.

9. In a photoelectric system, a transformer having a primary and a pair of secondaries, shields between the primary and secondaries, an audion having a grid, a cathode supplied with current by one of said secondaries, and an anode, an anode cathode circuit including the other secondary of the transformer and a current responsive device, a photoelectric tube having a cathode connected to the grid of the audion and an anode connected to the cathode of the audion, a variable condenser and a connection through said variable condenser from the grid of the audion to the primary of the transformer, the primary of said transformer being grounded.

10. In a system of the character described, an ionic valve having anode, cathode, and grid, a transformer having two windings conductively insulated from each other, an anode cathode circuit embracing one of said windings, said anode and said cathode, a high impedance control means connected between said grid and said anode cathode circuit, and a connection between said grid and the other of said windings.

11. In a system of the character described, an ionic valve having anode, cathode and control grid, a transformer having two windings conductively insulated from each other, a current responsive device, an anode cathode circuit embracing said anode, cathode, current responsive device and one of said windings, a photoelectric cell connected between said grid and said anode cathode circuit and means connecting said grid and the other of said windings.

12. In a system of the character described, a thermionic valve having anode, cathode and control electrode, a transformer having two windings conductively insulated from each other, an anode cathode circuit embracing said anode, cathode and one of said windings, a photoelectric cell, a conducting connection through said photoelectric cell between said cathode and grid, and means including a condenser connecting said grid to the other of said windings.

ARCHIE J. McMASTER.
JAMES G. WELLS.